Patented Aug. 24, 1943

2,327,698

UNITED STATES PATENT OFFICE 2,327,698

POULTRY FEED COMPRISING WOOL

Joseph W. Creely, Oaklyn, and John A. Levering, Haddonfield, N. J., assignors to Eavenson & Levering Co., a corporation of New Jersey No Drawing. Application June 6, 1942, Serial No. 446,136

3 Claims. (Cl. 99—4)

It is known that wool is eaten by the larvae of certain insects, but it has generally been considered that fibrous wool is non-assimilable by higher animals. We have made the surprising discovery that when wool fibers, either the original wool as it is shorn from the sheep or wool that has been advanced in manufacture, and particularly wool wastes such as the very short fibers obtained from the dusting of carbonized wools are mixed with other conventional feeding elements, they can be very largely assimilated by chickens or other members of the bird family and will serve in whole or in part to supply the desired animal protein elements, particularly the sulfur bearing element of cystine, which is commonly supplied by meat scraps.

The wool for this purpose should be in the form of short fibers. Ordinarily they should not exceed one-half inch in length, as longer fibers are more expensive and less readily digested. The average length of the fiber preferably will be less than one-quarter inch long. Wool dust obtained from woolen mills and particularly in mills where the wool is scoured or acid carbonized or given similar types of treatment actually is in the form of short fibers rather than being in the form of a powder and is particularly useful for this purpose. A partial or slight hydrolization which still leaves the wool in a fibrous form does not materially change its nature as far as our invention is concerned, but this is not necessary and adds to the expense of operation. It is an essential feature of our invention that the wool is digestible and available as a poultry food without being predigested.

The wool fibers referred to, even if so fine as to form dust or even if slightly hydrolized are still actually in the fibrous state and maintain the fibrous structure which heretofore has been considered to be non-assimilable. Though as stated, the fibers are preferably so broken or cut up that their length is quite short, ordinarily no special operation to produce these short fibers is necessary as the waste product from various woolen operations gives fibers of the proper length. Grinding, as in a ball mill, to produce a powder is not necessary and is to be avoided, because it tends to cause oxidation of the cystine and a definite reduction in the food value, as well as adding greatly to the cost.

The wool having the short fiber length previously described should be incorporated with other broken-up or finely divided conventional feeding ingredients which will largely be of a vegetable origin, though small amounts of additional animal material such as cod liver oil, dried buttermilk, dried meat scraps, as well as mineral ingredients are frequently added. As little as 0.5% of wool in the feeding mixture is of value and ordinarily it will not exceed 12% of the total. A good working proportion is between 1% and 5% based on the weight of the total feed.

Feeds prepared in this manner have been given to poultry over an extended period and a careful examination of the droppings shows that from 60% to 80% of the wool is assimilated, and on comparative feeding tests the poultry fed with feed containing such prepared wool in place of meat scrap or other animal protein showed equal growth and egg-laying power.

The term "wool" as used herein is intended to have the same meaning as that established by the Department of Agriculture which defines wool as the fiber from the fleece of a sheep or lamb, angora goat, camel, alpaca, llama, cashmere goat or vicuna.

What we claim is:

1. A poultry feed containing from 0.5% to 12% of short wool fibers obtained as waste fibers in a process of wool manufacture having an average length of not over ¼-inch, mixed with conventional feeding ingredients principally of vegetable origin.

2. A poultry feed having as an animal protein ingredient from 0.5% to 5% of carbonized wool fiber of an average length not exceeding ¼-inch.

3. A poultry feed having as an animal protein ingredient from 0.5% to 5% of wool fiber of an average length not exceeding ¼-inch and free from any substantial amount of fiber more than ½-inch long.

JOSEPH W. CREELY.
JOHN A. LEVERING.